US011920270B2

(12) United States Patent

Fu et al.

(10) Patent No.: US 11,920,270 B2

(45) Date of Patent: Mar. 5, 2024

(54) METHOD FOR MANUFACTURING FABRIC WITH HIGH-EFFICIENCY AND HIGH-PRECISION FLAT SCREEN AND DIGITAL PRINTED PATTERNS WITH ENERGY SAVING AND EMISSION-REDUCTION EFFECT

(71) Applicant: ZHEJIANG FURUN DYEING AND PRINTING CO., LTD., Shaoxing (CN)

(72) Inventors: Guozhu Fu, Beijing (CN); Yifeng Wang, Beijing (CN); Xuan Sun, Beijing (CN)

(73) Assignee: ZHEJIANG FURUN DYEING AND PRINTING CO., LTD., Shaoxing (CN)

( * ) Notice: Subject to any disclaimer, the term of this patent is extended or adjusted under 35 U.S.C. 154(b) by 209 days.

(21) Appl. No.: 17/580,972

(22) Filed: Jan. 21, 2022

(65) Prior Publication Data

US 2022/0213630 A1 Jul. 7, 2022

Related U.S. Application Data

(63) Continuation of application No. PCT/CN2021/075496, filed on Feb. 5, 2021.

(30) Foreign Application Priority Data

Jan. 7, 2021 (CN) ......................... 202110016917.0

(51) Int. Cl.

*D06C 23/00* (2006.01)
*B41J 3/407* (2006.01)

(Continued)

(52) U.S. Cl.

CPC ............ *D06C 23/02* (2013.01); *B41J 3/4078* (2013.01); *D06C 7/02* (2013.01); *D06C 9/02* (2013.01);

(Continued)

(58) Field of Classification Search

CPC ... D06C 23/02; D06C 7/02; D06C 9/02; B41J 3/4078; D06M 16/003; D06P 5/2072;

(Continued)

(56) References Cited

U.S. PATENT DOCUMENTS 6,156,072 A * 12/2000 Usui .......................... D06P 5/30 427/322
2009/0193209 A1 * 7/2009 Lo ........................ G06F 21/6209 711/E12.091

(Continued)

FOREIGN PATENT DOCUMENTS

CN 106835722 A * 6/2017 ............ D06M 16/00

*Primary Examiner* — Eisa B Elhilo
(74) *Attorney, Agent, or Firm* — WPAT, P.C

(57) ABSTRACT

A method for manufacturing fabric with flat screen and digital printed patterns includes: singeing, pretreatment, flat screen scraping sizing, drying, pattern printing, humidification, steaming treatment, washing, and non-ironing and soft setting. The pretreatment is a biological enzyme pretreatment process including: cloth feeding at 75° C., dipping, scouring and bleaching in a working fluid, heating to 90° C. for treatment of 30 minutes, draining, hot water washing and cold water washing. A shortened process flow can be realized, and the positioned sizing that uses a flat screen to scrape a sizing agent to a pattern position to be digital spray-printed on instead of traditional full-width sizing for sizing and printing, which greatly reduces the amount of sizing agent used, lowers production cost and reduces waste water pollution, and solves problem that the fabric is mottled caused by the application of sizing agent in areas without printed pattern due to full-width sizing.

9 Claims, 4 Drawing Sheets

(51) Int. Cl.
*D06C 7/02* (2006.01)
*D06C 9/02* (2006.01)
*D06C 23/02* (2006.01)
*D06M 16/00* (2006.01)
*D06P 5/20* (2006.01)

(52) U.S. Cl.
CPC ......... *D06M 16/003* (2013.01); *D06P 5/2072* (2013.01)

(58) Field of Classification Search
CPC .. D06P 1/0032; D06P 1/46; D06P 3/66; D06P 5/001; D06P 5/2077; D06P 5/30; D06B 11/0056; D06B 11/0059; D06L 1/14; D06L 4/00; D06L 4/40
USPC .............................................................. 8/445
See application file for complete search history.

(56) References Cited

U.S. PATENT DOCUMENTS

2011/0000027 A1* 1/2011 Greenspoon ......... D03D 15/217 8/445
2014/0259456 A1* 9/2014 Harris .................... D06C 29/00 8/445

* cited by examiner

METHOD FOR MANUFACTURING FABRIC WITH HIGH-EFFICIENCY AND HIGH-PRECISION FLAT SCREEN AND DIGITAL PRINTED PATTERNS WITH ENERGY SAVING AND EMISSION-REDUCTION EFFECT

TECHNICAL FIELD

The disclosure relates to the field of fabric production technologies, in particular to a method for manufacturing fabric with high-efficiency and high-precision flat screen and digital printed patterns with energy saving and emission-reduction effect.

BACKGROUND

With the continuous development of the market, consumer demand has become more diversified and individualized, and equipment manufacturers have begun to explore the application of digital inkjet printing technology in subdivided fields; the traditional printing fabric production process uses a separate flat/rotary screen, or separate digital inkjet printing, the separate use of flat/rotary screen is less efficient and consumes more energy, while the separate use of digital inkjet printing causes a higher cost. Moreover, the whole production process of existing printed fabric involves many complicated steps, so it needs to be further improved.

SUMMARY

The purpose of the disclosure is to overcome the shortcomings of the prior art and provide a method for manufacturing fabric with high-efficiency and high-precision flat screen and digital printed patterns with energy saving and emission-reduction effect.

The purpose of the disclosure is achieved through technical solutions as follows.

Specifically, a method for manufacturing fabric with high-efficiency and high-precision flat screen and digital printed patterns with energy saving and emission-reduction effect includes the following steps: singeing; pretreatment; flat screen scraping sizing, pre-drying, and pattern printing; drying; humidification; steaming treatment; washing; and non-ironing and soft setting.

The pretreatment is a biological enzyme pretreatment process with high-efficiency and short process, and a process flow of the biological enzyme pretreatment process includes: cloth feeding at 75° C.; dipping, scouring and bleaching in a working fluid; heating to 90° C. for treatment for 30 minutes; draining; hot water washing; and cold water washing.

In the step of pattern printing, a production device of flat screen and digital inkjet pattern printing is used, a flat screen pattern printing and a digital inkjet pattern printing are both performed, the digital inkjet pattern printing is used for fine patterns, and the flat screen pattern printing is used for large bottom scraping.

In an embodiment, in the step of singeing, a singeing machine is used, with a flame injection pressure of 15 mbar, a fabric passing speed of 100 m/min, and burners respectively facing towards front and rear sides of a fabric for double-faced singeing.

The disclosure has the following advantages:

1. for the flat screen scraping sizing, the need for the sizing process of the additional sizing machine is eliminated, so the process flow is short; the sizing adopts positioned sizing that uses flat screen to scrape the sizing agent to the position of the pattern to be digital spray-printed instead of full-width sizing, which greatly reduces the amount of sizing agent used, and because there are a lot of auxiliaries such as urea and sodium bicarbonate in the sizing agent, this also lowers production costs and reduces waste water pollution, and solves the problem that the fabric is mottled caused by the application of sizing agent in areas without printed pattern due to full-width sizing.

2. a non-ironing compound mixed softener and environmentally friendly resin is used to an one-step softening and non-ironing process, the non-ironing effect is good, and the fabric is soft and skin-friendly, which solves the problem of excessive formaldehyde in the ordinary non-ironing finishing process.

The integration of flat screen and digital printing in one unit can make them work together to improve production efficiency, and reduce energy consumption and emissions, and such design is more reasonable.

The screw sliding table on the support pillar moves the feeding limit seat over the conveyor belt on one side of the frame, the pushing cylinder pushes the connecting seat, the feeding rotating motor drives the feeding rotating gear to rotate, and the feeding rotating gear rotates to drive the four feeding limit racks meshed with the feeding rotating gear to move laterally, so that the feeding limit plates on the four feeding limit racks clamp the flat screen to be processed, and then the screw sliding table moves the flat screen to be processed over the limit seat, the pushing cylinder pushes the flat screen to be processed onto the limit seat, the feeding rotating motor rotates the feeding rotating gear, the feeding rotating gear rotates to drive the four feeding limit racks meshed with the feeding rotating gear to move laterally, so that the feeding limit plates on the four feeding limit racks release the flat screen to be processed, and the flat screen to be processed can be steadily placed on the limit seat to complete the feeding, so as to realize automatic feeding, which makes the flat screen processing and production more automated, reduces manual operations, and lowers costs.

When the flat screen to be processed is placed on the limit seat, the rotating motor drives the rotating gear to rotate, and the rotating gear rotates to drive the four limit racks meshed with the rotating gear to move horizontally, so that the limit plates on the four limit racks limit the flat screen to be processed, and then the turning motor on the moving support on one side of the frame drives the screw rod to rotate, the screw rod rotates and drives the moving rack with one end sleeved on the screw rod to move, and then the moving motor on the support frame at the moving rack rotates, and the moving motor rotates to drive the moving gear fixedly connected to it to rotate, the rotation of the moving gear makes the moving gear move horizontally on the moving rack meshed with it, and then the cylinder pushes the processing part fixedly connected to its output end to process the flat screen on the limit seat, so as to conveniently and quickly complete the supporting of flat screens of different specifications, shorten the screen changing time during screen processing, improve the production efficiency, and ensure the uniform force and movement accuracy of the lateral movement module.

After the processing is completed, the rotating motor rotates the rotating gear, and the rotating gear rotates to drive the four limit racks meshed with the rotating gear to move laterally, so that the limit plates on the four limit racks release the flat screen to be processed, and then the pushing cylinder pushes the connecting seat to push the feeding limit seat over the limit seat, the feeding rotating motor drives the feeding rotating gear to rotate, the feeding rotating gear rotates to drive the four feeding limit racks meshed with the feeding rotating gear move laterally, so that the feeding limit plates on the four feeding limit racks clamp the flat screen to be processed, and then the screw sliding table moves the flat screen to be processed over the conveyor belt on the other side to complete the discharging, so as to realize automatic discharging, which makes the flat screen processing and production more automated, reduces manual operations, and lowers costs.

DETAILED DESCRIPTION OF EMBODIMENTS

Figure 1:
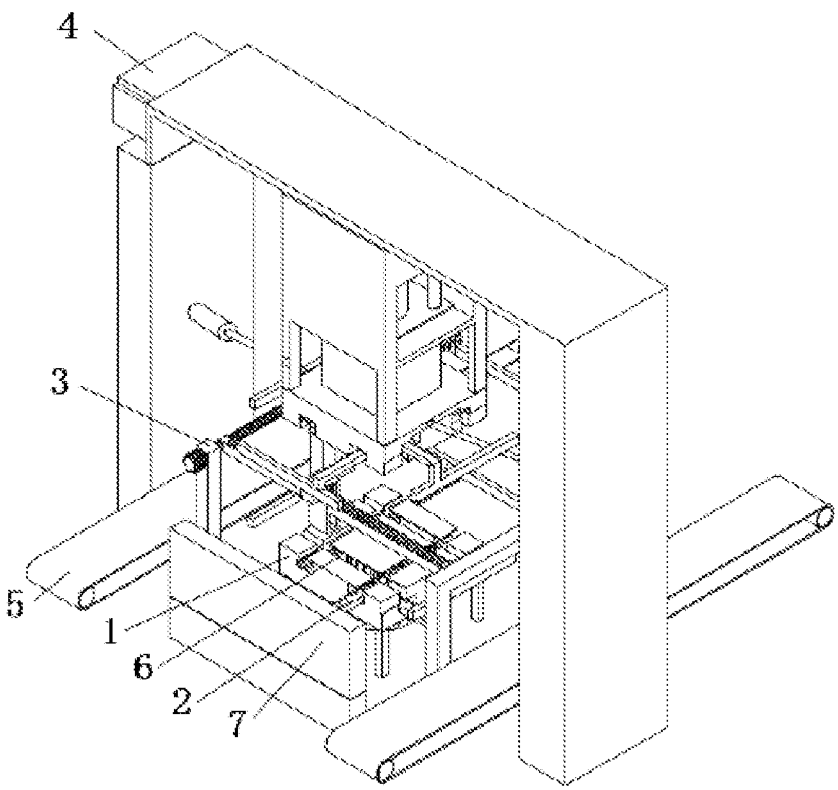
FIG. 1 is a three-dimensional structural diagram of a production device in the disclosure.

The disclosure will be further described below in conjunction with embodiments, but the protection scope of the disclosure is not limited to the following.

In an illustrated embodiment, rayon cloth is used.

The method for manufacturing fabric with high-efficiency and high-precision flat screen and digital printed patterns with energy saving and emission-reduction effect includes the following steps: singeing; pretreatment; flat screen scraping sizing, pre-drying, and pattern printing; drying; humidification; steaming treatment; washing; and non-ironing and soft-setting.

The pretreatment is a biological enzyme pretreatment process with high efficiency and short process, and a process flow of the biological enzyme pretreatment process includes: cloth feeding at 75° C.; dipping; scouring and bleaching in a working fluid; heating up to 90° C. for treatment for 30 minutes; draining; hot water washing; and cold water washing.

In the step of pattern printing, a flat screen+digital inkjet printing production device (also referred to as a production device of flat screen and digital inkjet pattern printing) is used, flat screen pattern printing and digital inkjet pattern printing are both performed, the digital inkjet pattern printing is used for fine patterns, and the traditional flat screen pattern printing method is used for large bottom scraping patterns.

In the step of singeing of the disclosure, a German Osthoff singeing machine is used, with a flame injection pressure of 15 milli-pascals (mbar), a fabric passing speed (also referred to as running speed) of 100 meters per minute (m/min), and burners respectively facing towards front and rear side of a fabric.

A biological enzyme pretreatment process technique with high efficiency short process is adopted. The process parameters of the biological enzyme pretreatment process with high efficiency short process include: 1.5 g/L of desizing enzyme (e.g., LD-6); 1 g/L of penetrant (e.g., MP-2); 1:6 of bath ratio; 300 m/min of cloth lifting speed; main pump efficiency: 90%, and quality index requirements including 5-9 centimeters per 5 minutes of capillary effect and a PH value in a range of 7-8.

The step of sizing adopts the positioned sizing that uses flat screen to scrape the sizing agent to the position of the pattern to be digital spray-printed instead of traditional full-width sizing for sizing and printing, and in the step of flat screen scraping sizing, a formula per 100 kg of the sizing agent includes:

70 kilograms (kg) of chemical synthesis paste; 3 kg of sodium bicarbonate; 1 kg of colorless anti-dyeing salt (e.g., 3-nitrobenzenesulfonic acid sodium salt); 3 kg of sodium sulfate; 7 kg of urea; 3 kg of hygroscopic agent (e.g., ST373 that a mixture of polyols and ether); and 13 kg of water. Among them, a formula per 100 kg of the chemical synthesis paste includes: 6 kg of polymer powder (e.g., DG-2 that a mixture in powder of natural and synthetic polymers) and 94 kg of water.

The chemical synthesis paste needs to be puffed evenly, and an overnight standing method is adopted to increase the puffing degree; the step of flat screen scraping sizing adopts synchronous scraping with printing, and after the scraping, the fabric is pre-dried on a machine station with an infrared dryer at a drying temperature of 80° C., and the flat screen pattern printing and the digital inkjet pattern printing are both performed.

In an embodiment, the digital ink adopts Honghua digital reactive ink, and its particle size is controlled below 1 micrometers (μm); ingredients per kilogram of flat screen pattern printing color paste includes: 1-10 grams (g) of reactive dye; 20-50 g of urea; 10-20 g of sodium bicarbonate; 400-600 g of semi-emulsified paste; and 320-570 g of water.

In the disclosure, the printing adopts the Japanese Toshin flat screen pattern printing machine equipped with Honghua digital pattern printing system, the digital inkjet pattern printing is used for fine patterns, and the traditional flat screen pattern printing method is used for large bottom scraping patterns, which greatly improves the production efficiency, and saves production costs.

(1) Selection of digital ink: Honghua digital reactive ink is used, which has excellent performance and can produce high-quality patterns on the gray fabric.
   ① It has good light fastness and wet fastness;
   ② The particle size is controlled below 1 μm, so it is not easy to block the nozzle;
   ③ It can be stored for a long time, and the printing effect will not be affected;
   ④ Its physical properties such as viscosity, conductivity, and surface tension are all within the specified range;
   ⑤ Non-toxic, safe, and non-flammable.

(2) Selection of synthesis paste for large bottom scraping: the semi-emulsified paste composed of sodium alginate paste and emulsion thickener is used, which has good rheology, good mesh permeability, uniform color yield, and high color yield, and is of great benefit to the fabric handle and the prevention of uneven dyeing. When preparing the semi-emulsified paste, the selection of emulsifier and the uniform emulsification are the keys to the preparation.

(3) The selection of large bottom scraping dye and process development: In order to obtain a strong and bright printing color effect, and prevent uneven dyeing and color wilting, we use imported Ciba P-type reactive dyes and adopt an open source automatic mixing system to prepare the color paste, with the viscosity between 350-450 pascal-second (Pa·S), and carry out intensive and intelligent management, so that the production process is environmentally friendly, energy-saving and emission-reducing.

(4) Flat screen and digital inkjet pattern printing: The high-efficiency flat screen and digital inkjet pattern printing process technique is adopted for printing, and the Honghua digital pattern printing system equipped with 40 nozzles is installed on the Japanese Toshin flat screen pattern printing machine. The digital inkjet pattern printing is used for fine patterns, and the traditional flat screen pattern printing method is used for large bottom scraping patterns; the pattern fineness and color richness are better than traditional flat screen pattern printing products. Moreover, the consumption of digital reactive ink is greatly reduced; it has faster speed and better penetration than full digital inkjet pattern printing, and has full background color, solid color, and wide color gamut, which reduces the cost of digital reactive ink and improves production efficiency. The digital inkjet pattern printing area is separately enclosed and isolated for air-conditioning refrigeration to prevent nozzle blockage, the refrigerated area is small and will not be affected by the high temperature of drying, which saves energy and reduces consumption.

After the step of pattern printing is completed, the fabric enters the drying room for drying, a temperature of the drying room is in a range of 80~110° C., and fabric passing speed is in a range of 6-8 m/min; the fabric should be dried evenly in time, and sealed with plastic wrap paper after drying to keep it from moisture and avoid that the fabric is mottled.

When the viscose fiber is steamed, the process of absorbing a large amount of humidity from the steam is an exothermic process, the rise of the temperature of the fabric itself and the steam in the steamer will cause such problems as uneven color yield, and color difference between batches of the fabric; a humidifier is used to spray on the surface of the fabric for humidification before steaming treatment, and the humidification process parameters: fabric passing speed is 20 m/min, and the humidification is sufficient and uniform.

Specifically, process parameters for steaming treatment includes: a ring length of 2.3 meters (m); a temperature of the steaming treatment in a range of 102° C.~104° C., a time of the steaming treatment of 10 min, a fabric passing speed of 26 m/min, and a steam flow rate of 900 kilograms per hour (kg/h).

In the step of washing, a continuous loose open-width washing machine is used, and a fabric passing speed is 35 m/min, cold water in a first cylinder and a second cylinder showering through a padder, then soap boiling is performed with 4 g/L of soaping agent at a water temperature of 90° C. in a third cylinder, a fourth cylinder, a fifth cylinder, a seventh cylinder and an eighth cylinder, subsequently cleaning is performed by cold water in a ninth cylinder and a tenth cylinder; afterwards squeezing, and finally drying.

In an embodiment, in the step of non-ironing and soft setting, resin non-ironing finishing is adopted.

The formula of the working fluid for non-ironing and soft-setting includes: 100 g/L of resin EF0; 50 g/L of catalyst 533; 70 g/L of super-elastic water-based silica gel X-1; and 5 g/L of glycine.

Specifically, process parameters of the soft setting include: 137 centimeters (cm) of frame door width, 135 cm of effective door width, 126 grams per square meter (g/m$^2$) of gram weight, a temperature of 170° C., a speed of 25 m/min, 900 revolutions per minute (r/min) of air volume, and an overfeed of 13%.

TABLE 1

Comparison of main parameters of similar domestic techniques

| Test items | Index requirements | Actual | FZ/T14004—2014 First-class products |
|---|---|---|---|
| Breaking strength/N | Warp direction ≥350<br>Weft direction ≥350 | Warp direction 450<br>Weft direction 400 | Warp direction ≥250<br>Weft direction ≥200 |
| Size change rate of water washing/% | Warp direction −3.0~+1.5<br>Weft direction −3.0~+1.5 | Warp direction −2.3<br>Weft direction +1.5 | Warp direction −6.0~+1.5<br>Weft direction −6.0~+1.5 |
| Color fastness to washing (Grade) | Discoloration ≥4<br>Staining ≥3-4 | Discoloration 4-5<br>Staining 4-5 | Discoloration ≥3<br>Staining ≥3 |
| Color fastness to perspiration (Grade) | Discoloration ≥3-4<br>Staining ≥4 | Discoloration 4-5<br>Staining 4-5 | Discoloration ≥3-4<br>Staining ≥3-4 |
| Dry rubbing | ≥4 | 4-5 | ≥3-4 |
| Wet rubbing | ≥3-4 | 4 | ≥2-3 |

The product quality indicators of the "high-efficiency and high-precision flat screen digital printing high-end spring and summer fashion fabrics" are tested by the Comprehensive Technical Service Center of China Shaoxing Customs, and all technical indicators meet the requirements of a Chinese standard of FZ/T14004-2014 *Printed and Dyed Viscose Fabric*; with precise patterns and rich colors, it greatly reduces the consumption of digital reactive ink, and has faster speed and better penetration than full digital inkjet pattern printing, thus improving the production efficiency. The digital inkjet pattern printing area is separately enclosed and isolated for air-conditioning refrigeration, the refrigerated area is small and will not be affected by the high temperature of drying, which saves energy and reduces consumption. A self-made humidifying device is adopted for moistening in the steaming treatment step to improve the color fastness and the color yield through steaming treatment and fixation. The after-finish adopts environmentally-friendly resin non-ironing finishing, the non-ironing effect is good, and the non-ironing effect after three washings and three dryings has reached Grade III and above; the project products are soft and skin-friendly, with good moisture absorption, good air permeability, simple care, and good chlorine bleaching fastness, can satisfies the multi-faceted requirements of high-end clothing and summer women's clothing fabrics, and have a good market prospect.

Specifically, as shown in FIGS. 1-6, the production device of flat screen and digital inkjet pattern printing includes a frame 1, a limit assembly 2, a moving assembly 3, a feeding assembly 4, and conveyor belts 5. The limit assembly 2 is arranged on a top of the frame 1, and the limit assembly 2 is fixedly connected to the frame 1. The moving assembly 3 is arranged beside the frame 1, and the moving assembly 3 is located above the limit assembly 2. The feeding assembly 4 includes a feeding limit part 42 and a feeding moving part 41, the feeding moving part 41 is arranged on one side of the frame 1, and the feeding limit part 42 is arranged inside the feeding moving part 41, and the feeding limit part 42 and the feeding moving part 41 are fixedly connected. Two conveyor belts 5 are provided, and the two conveyor belts 5 are symmetrically arranged on both sides of the moving assembly 3.

Specifically, the limit assembly 2 includes a limit seat 21, limit racks 22, limit plates 23, a rotating motor 24, and a rotating gear 25. The limit seat 21 is arranged on the top of the frame 1, and the limit seat 21 and the frame 1 are fixedly connected. The rotating motor 24 is arranged at a bottom of the frame 1, the rotating gear 25 is arranged inside the limit seat 21, and the rotating gear 25 and the output end of the rotating motor 24 are fixedly connected. Four limit racks 22 are provided, the four limit racks 22 are arranged at equal angles along the circumferential direction of the rotating gear 25, and the four limit racks 22 are all meshed with the rotating gear 25. Four limit plates 23 are provided, and the four limit plates 23 are installed on the corresponding limit racks 22, respectively. When the flat screen to be processed is placed on the limit seat 21, the rotating motor 24 drives the rotating gear 25 to rotate, and the rotating gear 25 rotates to drive the four limit racks 22 meshed with the rotating gear 25 to move horizontally, so that the limit plates 23 on the four limit racks 22 limit the flat screen to be processed. Then, the rotating motor 39 on the moving bracket 37 on one side of the frame 1 drives the screw rod 31 to rotate, the screw rod 31 rotates and drives the moving rack 32 with one end sleeved on the screw rod 31 to move. The moving motor 33 on the support frame 35 at the moving rack 32 rotates, the moving motor 33 rotates to drive the moving gear 34 fixedly connected to it to rotate, and the rotation of the moving gear 34 makes the moving gear 34 move horizontally on the moving rack 32 meshed with it. The cylinder 36 pushes the processing part fixedly connected to its output end to process the flat screen on the limit seat 21, so as to conveniently and quickly complete the supporting of flat screens of different specifications, shorten the screen changing time during screen processing, improve the production efficiency, and ensure the uniform force and movement accuracy of the lateral movement module.

Specifically, the moving assembly 3 includes a screw rod 31, a moving rack 32, a moving motor 33, a moving gear 34, a support frame 35, an air cylinder 36, two moving supports 37, and a turning motor 39. The two moving supports 37 are symmetrically arranged on both sides of the frame 1, the turning motor 39 is installed on the side wall of the moving support 37, the screw rod 31 is rotatably installed on the moving bracket 37 on one side of the frame 1, and one end of the screw rod 31 is fixedly connected to the output end of the turning motor 39. The moving rack 32 is horizontally arranged, and one end of the moving rack 32 is sleeved on the screw rod 31. The support frame 35 is arranged on the moving rack 32, and the moving gear 34 is arranged inside the support frame 35, and the moving gear 34 meshes with the moving rack 32. The moving motor 33 is arranged on the outer side wall of the support frame 35, and the output end of the moving motor 33 is fixedly connected to the moving gear 34. The air cylinder 36 is arranged inside the support frame 35, and the air cylinder 36 is located below the moving rack 32. The moving bracket 37 on the other side of the frame 1 is provided with a sliding chute 38 for the moving rack 32 to slide. When the flat screen to be processed is placed on the limit seat 21, the rotating motor 24 drives the rotating gear 25 to rotate, and the rotating gear 25 rotates to drive the four limit racks 22 meshed with the rotating gear 25 to move horizontally, so that the limit plates 23 on the four limit racks 22 limit the flat screen to be processed, and then the rotating motor 39 on the moving bracket 37 on one side of the frame 1 drives the screw rod 31 to rotate, the screw rod 31 rotates and drives the moving rack 32 with one end sleeved on the screw rod 31 to move, and then the moving motor 33 on the support frame 35 at the moving rack 32 rotates, and the moving motor 33 rotates to drive the moving gear 34 fixedly connected to it to rotate, the rotation of the moving gear 34 makes the moving gear 34 move horizontally on the moving rack 32 meshed with it, and then the cylinder 36 pushes the processing part fixedly connected to its output end to process the flat screen on the limit seat 21, so as to conveniently and quickly complete the supporting of flat screens of different specifications, shorten the screen changing time during screen processing, improve the production efficiency, and ensure the uniform force and movement accuracy of the lateral movement module.

Specifically, the feeding moving part 41 includes support pillars 411, a connecting seat 412, a pushing cylinder 413, and a screw sliding table 414. The support pillars 411 are erected on the two conveyor belts 5, the screw sliding table 414 is horizontally arranged upside down on the top of the two support pillars 411, the top of the moving end of the screw sliding table 414 is fixedly connected to the top of the connecting seat 412, and the pushing cylinder 413 is arranged inside the connecting seat 412. Firstly, the screw sliding table 414 on the support pillar 411 moves the feeding limit seat 421 over the conveyor belt 5 on one side of the frame 1, the pushing cylinder 413 pushes the connecting seat 412, the feeding rotating motor 424 drives the feeding rotating gear 425 to rotate, and the feeding rotating gear 425 rotates to drive the four feeding limit racks 422 meshed with the feeding rotating gear 425 to move laterally, so that the feeding limit plates 423 on the four feeding limit racks 422 clamp the flat screen to be processed, and then the screw sliding table 414 moves the flat screen to be processed over the limit seat 21, the pushing cylinder 413 pushes the flat screen to be processed onto the limit seat 21, the feeding rotating motor 424 rotates the feeding rotating gear 425, the feeding rotating gear 425 rotates to drive the four feeding limit racks 422 meshed with the feeding rotating gear 425 to move laterally, so that the feeding limit plates 423 on the four feeding limit racks 422 release the flat screen to be processed, and the flat screen to be processed can be steadily placed on the limit seat 21 to complete the feeding, so as to realize automatic feeding, which makes the flat screen processing and production more automated, reduces manual operations, and lowers costs.

Specifically, the feeding limit part 42 includes a feeding limit seat 421, feeding limit racks 422, feeding limit plates 423, a feeding rotating motor 424, and a feeding rotating gear 425. The feeding limit seat 421 is arranged at the top of the frame 1, and the feeding limit seat 421 is fixedly connected to the frame 1. The feeding rotating motor 424 is arranged at the bottom of the frame 1, the feeding rotating gear 425 is arranged inside the loading limit seat 421, and the feeding rotating gear 425 is fixedly connected to the output end of the feeding rotating motor 424. Four feeding limit racks 422 are provided, the four feeding limit racks 422 are arranged at equal angles along the circumferential direction of the feeding rotating gear 425, and the four feeding limit racks 422 are all meshed with the feeding rotating gear 425. Four feeding limit plates 423 are provided, the four feeding limit plates 423 are installed on the corresponding feeding limit racks 422, respectively, the feeding rotating motor 424 is located inside the connecting seat 412, and the feeding limit seat 421 is fixedly connected to the connecting seat 412. Firstly, the screw sliding table 414 on the support pillar 411 moves the feeding limit seat 421 over the conveyor belt 5 on one side of the frame 1, the pushing cylinder 413 pushes the connecting seat 412, the feeding rotating motor 424 drives the feeding rotating gear 425 to rotate, and the feeding rotating gear 425 rotates to drive the four feeding limit racks 422 meshed with the feeding rotating gear 425 to move laterally, so that the feeding limit plates 423 on the four feeding limit racks 422 clamp the flat screen to be processed, and then the screw sliding table 414 moves the flat screen to be processed over the limit seat 21, the pushing cylinder 413 pushes the flat screen to be processed onto the limit seat 21, the feeding rotating motor 424 rotates the feeding rotating gear 425, the feeding rotating gear 425 rotates to drive the four feeding limit racks 422 meshed with the feeding rotating gear 425 to move laterally, so that the feeding limit plates 423 on the four feeding limit racks 422 release the flat screen to be processed, and the flat screen to be processed can be steadily placed on the limit seat 21 to complete the feeding, so as to realize automatic feeding, which makes the flat screen processing and production more automated, reduces manual operations, and lowers costs.

Specifically, the limit seat 21 and the feeding limit seat 421 are both provided with moving grooves 6 for the feeding limit racks 422 and the limit racks 22 to move, so as to facilitate the limit plates 23 to limit flat screens of different sizes.

Specifically, one side of the frame 1 is provided with a fan 7 for cleaning the limit seat 21, which can clean the dye on the flat screen and keep the flat screen clean.

The working process of the disclosure is as follows: firstly, the screw sliding table 414 on the support pillar 411 moves the feeding limit seat 421 over the conveyor belt 5 on one side of the frame 1, the pushing cylinder 413 pushes the connecting seat 412, the feeding rotating motor 424 drives the feeding rotating gear 425 to rotate, and the feeding rotating gear 425 rotates to drive the four feeding limit racks 422 meshed with the feeding rotating gear 425 to move laterally, so that the feeding limit plates 423 on the four feeding limit racks 422 clamp the flat screen to be processed, and then the screw sliding table 414 moves the flat screen to be processed over the limit seat 21, the pushing cylinder 413 pushes the flat screen to be processed onto the limit seat 21, the feeding rotating motor 424 rotates the feeding rotating gear 425, the feeding rotating gear 425 rotates to drive the four feeding limit racks 422 meshed with the feeding rotating gear 425 to move laterally, so that the feeding limit plates 423 on the four feeding limit racks 422 release the flat screen to be processed, and the flat screen to be processed can be steadily placed on the limit seat 21 to complete the feeding, so as to realize automatic feeding, which makes the flat screen processing and production more automated, reduces manual operations, and lowers costs. When the flat screen to be processed is placed on the limit seat 21, the rotating motor 24 drives the rotating gear 25 to rotate, and the rotating gear 25 rotates to drive the four limit racks 22 meshed with the rotating gear 25 to move horizontally, so that the limit plates 23 on the four limit racks 22 limit the flat screen to be processed, and then the rotating motor 39 on the moving bracket 37 on one side of the frame 1 drives the screw rod 31 to rotate, the screw rod 31 rotates and drives the moving rack 32 with one end sleeved on the screw rod 31 to move, and then the moving motor 33 on the support frame 35 at the moving rack 32 rotates, and the moving motor 33 rotates to drive the moving gear 34 fixedly connected to it to rotate, the rotation of the moving gear 34 makes the moving gear 34 move horizontally on the moving rack 32 meshed with it, and then the cylinder 36 pushes the processing part fixedly connected to its output end to process the flat screen on the limit seat 21, so as to conveniently and quickly complete the supporting of flat screens of different specifications, shorten the screen changing time during screen processing, improve the production efficiency, and ensure the uniform force and movement accuracy of the lateral movement module. After the processing is completed, the rotating motor 24 rotates the rotating gear 25, and the rotating gear 25 rotates to drive the four limit racks 22 meshed with the rotating gear 25 to move laterally, so that the limit plates 23 on the four limit racks 22 release the flat screen to be processed, and then the pushing cylinder 413 pushes the connecting seat 412 to push the feeding limit seat 421 over the limit seat 21, the feeding rotating motor 424 drives the feeding rotating gear 425 to rotate, the feeding rotating gear 425 rotates to drive the four feeding limit racks 422 meshed with the feeding rotating gear 425 move laterally, so that the feeding limit plates 423 on the four feeding limit racks 422 clamp the flat screen to be processed, and then the screw sliding table 414 moves the flat screen to be processed over the conveyor belt 5 on the other side to complete the discharging, so as to realize automatic discharging, which makes the flat screen processing and production more automated, reduces manual operations, and lowers costs.

Figure 2:
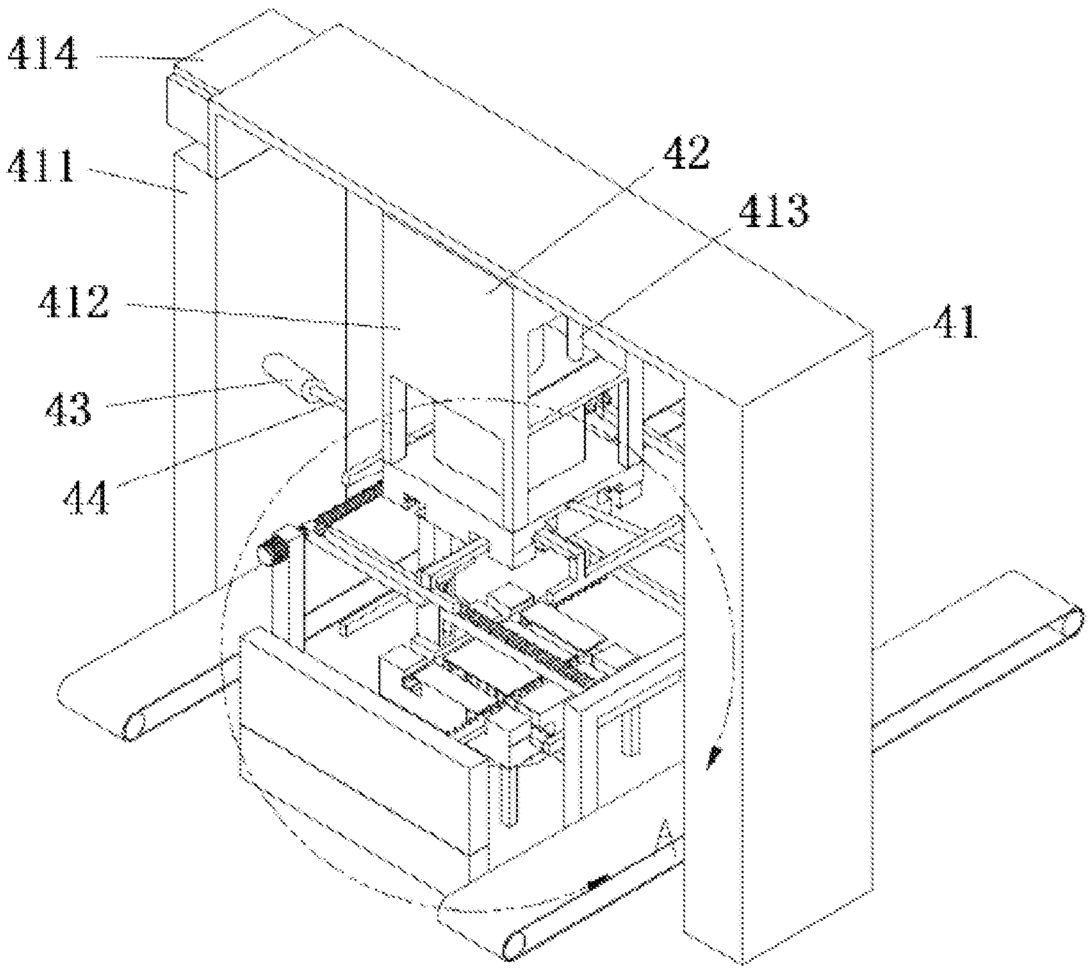
FIG. 2 is a three-dimensional structural diagram of the production device in the disclosure from a first angle.
Figure 3:
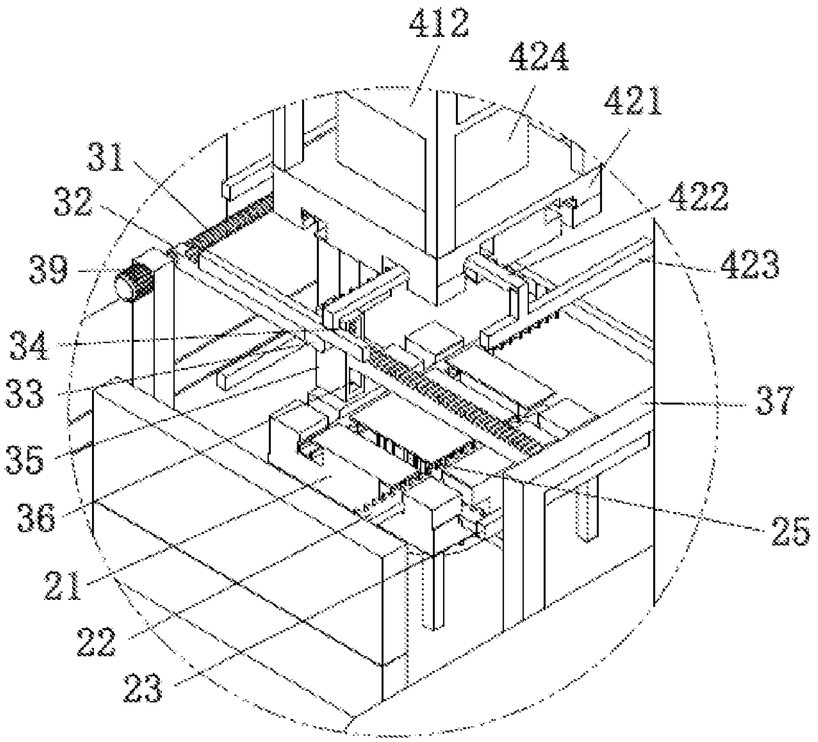
FIG. 3 is an enlarged view of part A in FIG. 2.
Figure 4:
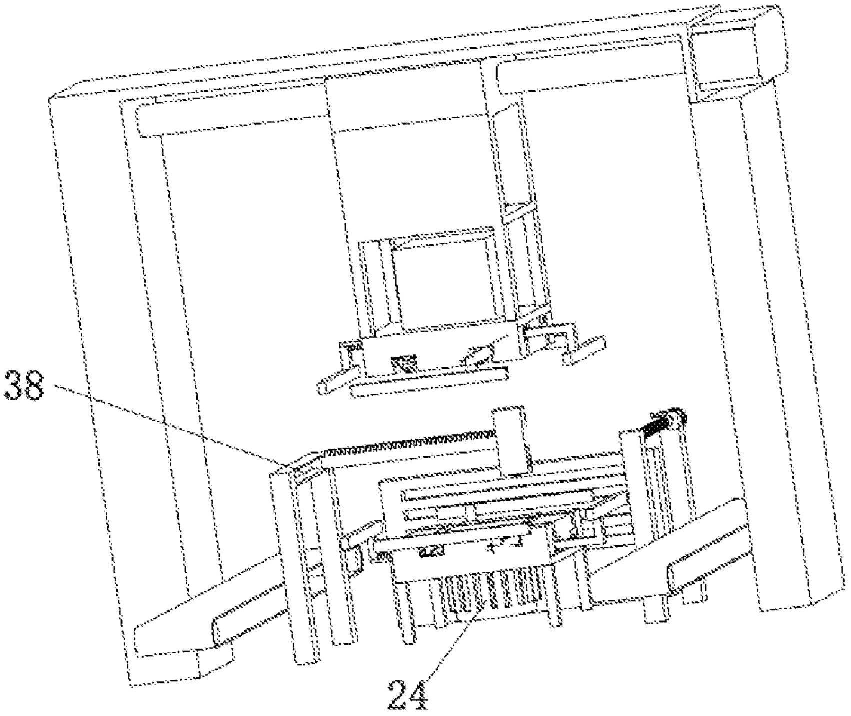
FIG. 4 is a three-dimensional structural diagram of the production device in the disclosure from a second angle.
Figure 5:
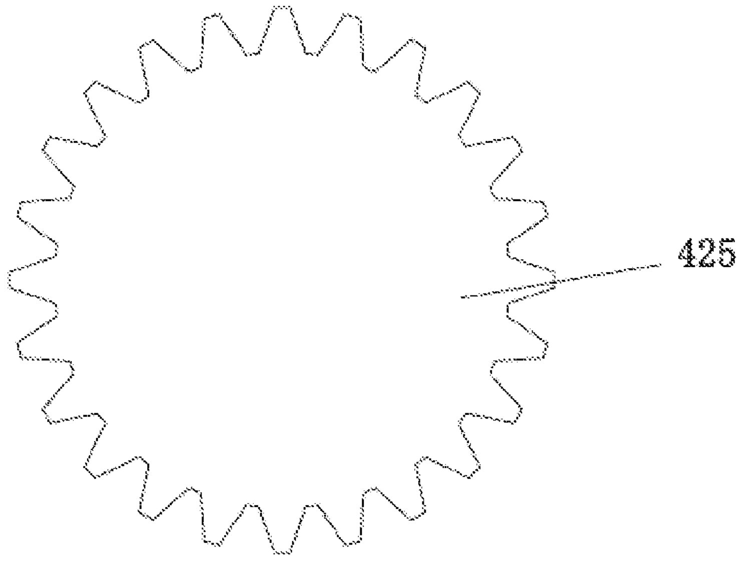
FIG. 5 is a three-dimensional structural diagram of a feeding rotating gear in the disclosure.
Figure 6:
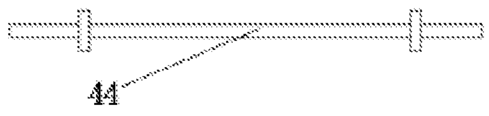
FIG. 6 is a schematic structural diagram of a horizontal guide rod of the feeding rotating gear in the disclosure.

Secondly, as shown in FIG. 2 and FIG. 6, cantilever elastic limit parts 43 are arranged on the two vertical inner surfaces of the feeding limit part 42 respectively, the feeding limit part 42 is located between the suspended ends of the two cantilever elastic limit parts 43, and the axis lines of the two cantilever elastic limit parts 43 coincide; there is a gap between end surfaces of the suspended ends of the feeding limit part 42 and the cantilever elastic limit parts 43; a horizontal guide rod 44 of which the axis line coincides with the axis lines of the cantilever elastic limit parts 43 passes through the feeding limit part 42, one end of the horizontal guide rod 44 extends into one of the cantilever elastic limit parts 43 and the horizontal guide rod and the one of the two cantilever elastic limit parts are movably connected with each other, and the other end of the horizontal guide rod 44 extends into the other cantilever type elastic limit part 43 and the horizontal guide rod and the other one of the two cantilever elastic limit parts are movably connected with each other.

The cantilever elastic limit parts 43 are a horizontally arranged springs, which can play the role of limit and shock absorption after contact, and prevent the feeding moving part 41 from shaking greatly due to inertia after moving to a predetermined position and braking.

The two ends of the horizontal guide rod 44 respectively extend into the cantilever elastic limit parts 43, the two ends of the horizontal guide rod 44 are respectively provided with limit rings, and the outer diameter of each of the limit rings is larger than the outer diameter of each of the springs, so as to play a limiting role when the spring is compressed.

The synergy of the horizontal guide rod 44 and the cantilever elastic limit parts 43 can improve the smoothness of the movement of the feeding moving part 41, and can also function as an extreme movement protection.

Moreover, both ends of the horizontal guide rod 44 are respectively provided with arc convex surfaces to prevent the ends of the horizontal guide rod 44 from pressing against the position between the turns of the springs.

In addition, the feeding limit part 42 is disposed with a transverse through hole, the horizontal guide rod 44 penetrates the transverse through hole, and a number of countersunk heads threadedly connected with the feeding limit part 42 are penetrated at the bottom of the feeding limit part 42, the threaded end surfaces of the countersunk screws press against the horizontal guide rod 44, and with this structure, the position of the horizontal guide rod 44 can be adjusted.

A screw is penetrated in the radial direction of the limit ring, and the threaded end of the screw presses against the horizontal guide rod 44 to facilitate the adjustment of the position of the limit ring.

Each of the cantilever elastic limit parts 43 is fixed on the corresponding one of the vertical inner surfaces of the feeding limit part 42 through a flange.

By using the production device, energy consumption and emissions can be greatly reduced, the design is more reasonable, and the production and processing efficiency is improved.

Although the embodiments of the disclosure have been shown and described, for those of ordinary skill in the art, it can be understood that various changes, modifications, substitutions, and variations can be made to these embodiments without departing from the principle and spirit of the disclosure, and the scope of the disclosure is defined by the appended claims and their equivalents.

What is claimed is:

1. A method for manufacturing fabric with flat screen and digital printed patterns, comprising steps of:

- singeing a fabric to be processed to obtain a singed fabric;
- performing pretreatment on the singed fabric to obtain a pretreated fabric;
- performing flat screen scraping sizing, pre-drying and pattern printing on the pretreated fabric to obtain a pattern printed fabric;
- drying the pattern printed fabric to obtain a dried fabric;
- performing humidification on the dried fabric to obtain a humidified fabric;
- performing steaming treatment on the humidified fabric to obtain a treated fabric;
- washing the treated fabric to obtain a washed fabric; and
- performing non-ironing and soft setting on the washed fabric, so as to obtain the fabric with flat screen and digital printed patterns;
- wherein the pretreatment is a biological enzyme pretreatment process, and a process flow of the biological enzyme pretreatment process is performed by: cloth feeding at 75° C.; dipping, scouring and bleaching in a working fluid; heating up to 90° C. for treatment for 30 minutes; draining; hot water washing; and cold water washing.

2. The method according to claim 1, wherein in the step of singeing, a singeing machine is used, with a flame injection pressure of 15 milli-pascals (mbar), a fabric passing speed of 100 meters per minute (m/min), and burners respectively facing towards front and rear sides of the fabric to be processed for double-faced singeing.

3. The method according to claim 1, wherein process parameters of the biological enzyme pretreatment process comprise: 1.5 grams per liter (g/L) of desizing enzyme, 1 g/L of penetrant, 1:6 of bath ratio, 300 m/min of fabric lifting speed, main pump efficiency of 90%, and quality index requirements including 5-9 centimeters per 5 minutes of capillary effect and a PH value in a range of 7-8.

4. The method according to claim 1, wherein the step of flat screen scraping sizing, pre-drying and pattern printing comprises:

- performing a positioned sizing by using a flat screen to scrape a sizing agent to a position of a pattern to be digital inkjet-printed instead of full-width sizing,
- wherein a formula per 100 kilograms (kg) of the sizing agent comprises: 70 kg of chemical synthesis paste, 3 kg of sodium bicarbonate, 1 kg of colorless anti-dyeing salt, 3 kg of sodium sulfate, 7 kg of urea, 3 kg of hygroscopic agent, and 13 kg of water;
- wherein a formula per 100 kg of the chemical synthesis paste comprises: 6 kg of polymer powder and 94 kg of water;
- wherein the chemical synthesis paste is evenly puffed by using an overnight standing method to increase a puffing degree;
- wherein the flat screen scraping sizing and the pattern printing are performed synchronously, and then a sized fabric is pre-dried on a machine station with an infrared dryer at a drying temperature of 80° C.

5. The method according to claim 1, wherein a digital ink used in the step of pattern printing is a reactive ink, and a particle size of the reactive ink is controlled below 1 micrometer (μm);

- wherein ingredients of per kilogram of color paste for a flat screen pattern printing comprises:
- 1-10 g of reactive dye, 20-50 g of urea; 10-20 g of sodium bicarbonate, 400-600 g of semi-emulsified paste, and 320-570 g of water.

6. The method according to claim 1, wherein after the step of pattern printing, the pattern printed fabric is placed into a drying room for drying, a temperature in the drying room is in a range of 80-110° C., and a fabric passing speed is in a range of 6-8 m/min.

7. The method according to claim 1, wherein before the step of steaming treatment, a humidifier is used to spray a mist on a surface of the dried fabric for the humidification, and process parameters for the humidification comprise: 20 m/min of fabric passing speed;

- wherein process parameters for the steaming treatment comprise: a ring length of 2.3 meters, a temperature of the steaming treatment in a range of 102-104° C., a time of the steaming treatment of 10 min, a fabric passing speed of 26 m/min, and a steam flow rate of 900 kilograms per hour (kg/h).

8. The method according to claim 1, wherein in the step of washing, a continuous loose open-width washing machine is used, and a fabric passing speed is 35 m/min; cold water in a first cylinder and a second cylinder showers through a padder, then soap boiling is performed with 4 g/L of soaping agent at a water temperature of 90° C. in a third cylinder, a fourth cylinder, a fifth cylinder, a seventh cylinder and an eighth cylinder, subsequently cleaning is performed by cold water in a ninth cylinder and a tenth cylinder, afterwards squeezing, and finally drying.

9. The method according to claim 1, wherein in the step of non-ironing and soft setting, resin is used for non-iron finishing;

wherein a formula of a working fluid for the step of non-ironing and soft setting comprises: 100 g/L of resin, 50 g/L of catalyst, 70 g/L of water-based silica gel, and 5 g/L of glycine;

wherein process parameters of the soft setting comprise: 137 centimeters (cm) of frame door width, 135 cm of effective door width, 126 grams per square meter ($g/m^2$) of gram weight, 170° C. of temperature, 25 m/min of fabric passing speed, 900 revolutions per minute (r/min) of air volume, and 13% of overfeed.

* * * * *